United States Patent
Shin et al.

(10) Patent No.: US 9,502,975 B2
(45) Date of Patent: Nov. 22, 2016

(54) SWITCH CONTROL CIRCUIT, SWITCH CONTROL METHOD AND CONVERTER USING THE SAME

(71) Applicant: Magnachip Semiconductor, Ltd., Cheongju-si (KR)

(72) Inventors: Doo Soo Shin, Seoul (KR); Youn Ggi Ryu, Seoul (KR); Zhi Yuan Cui, Cheongju-si (KR); Hae Wook Kim, Incheon (KR); In Ho Hwang, Icheon (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 97 days.

(21) Appl. No.: 14/535,700

(22) Filed: Nov. 7, 2014

(65) Prior Publication Data

US 2015/0256068 A1    Sep. 10, 2015

(30) Foreign Application Priority Data

Mar. 10, 2014 (KR) ........................ 10-2014-0027968

(51) Int. Cl.
*H02M 3/156* (2006.01)
*H05B 33/08* (2006.01)

(52) U.S. Cl.
CPC ......... *H02M 3/156* (2013.01); *H05B 33/0818* (2013.01); *Y02B 20/347* (2013.01)

(58) Field of Classification Search
CPC ........... G05F 1/56; G05F 1/575; H02M 3/156; H02M 3/157; H02M 3/158
USPC ........ 323/273, 280, 282, 283, 284, 285, 351
See application file for complete search history.

(56) References Cited

U.S. PATENT DOCUMENTS

| | | | |
|---|---|---|---|
| 5,345,180 A * | 9/1994 | Maier | G01R 31/025 324/500 |
| 7,863,836 B2 | 1/2011 | Mednik et al. | |
| 8,120,335 B2 | 2/2012 | Caldwell | |
| 2010/0244793 A1 | 9/2010 | Caldwell | |
| 2010/0244801 A1 * | 9/2010 | Arora | H02M 3/1563 323/284 |
| 2011/0273812 A1 * | 11/2011 | Beer | F02D 41/20 361/152 |
| 2012/0249166 A1 * | 10/2012 | Schmidtlein | G01R 27/14 324/654 |

* cited by examiner

*Primary Examiner* — Adolf Berhane (57) ABSTRACT

Provided is a switch control circuit for controlling a current control switch of a power supply, the power supply including a load, an inductor and the current control switch that are series-coupled to an input power. The switch control circuit includes a current measuring unit configured to measure a current flowing into the load, a current integral unit configured to integrate the measured current, a comparison unit configured to compare the integrated current value and a reference value and a control unit coupled to the current control switch, the control unit being configured to turn off the current control switch when the integrated current is substantially the same as the reference value and turn on the current control switch when a predefined off-time elapses from a time when the current control switch is turned off. The switch control circuit may quickly and accurately control an average current.

20 Claims, 5 Drawing Sheets

SWITCH CONTROL CIRCUIT, SWITCH CONTROL METHOD AND CONVERTER USING THE SAME

CROSS-REFERENCE TO RELATED APPLICATIONS

This application claims the benefit under 35 USC §119(a) of Korean Patent Application No. 10-2014-0027968 filed on Mar. 10, 2014, in the Korean Intellectual Property Office, the entire disclosure of which is incorporated herein by reference for all purposes.

BACKGROUND

1. Field

The following description relates to a switch control technology. The following description also relates to a switch control circuit, method, and a converter using the same capable of controlling a stable average current regardless of an input change, a peripheral parts change, a load change or a switch off-time.

2. Description of Related Art

A power supply is an apparatus that supplies a power to a load. A buck converter, one of the power supplies, corresponds to a step-down DC-DC converter. That is, such a converter outputs a voltage that is lower than an input voltage. The buck converter uses an inductor and two switches, for example, where the two switches are a transistor and a diode, controlling the inductor to repeatedly perform a process of storing an energy supply in the inductor and that of discharging the inductor to a load.

A linear regulator may be used instead of a buck converter to lower the voltage of a DC power supply. However, the use of a linear regulator presents an issue that the waste of energy that occurs as it operates is high because a linear regulator operates in a manner that involves a significant portion of the extra power being exhausted into a heat. Meanwhile, when a buck converter is implemented as an integrated circuit, the buck converter is commonly used because at least 95% of the power supplied to it can be converted.

The buck converter coupled with a LED (Light Emitting Diode) may include a switch controlling a current that flows to the LED, a sensing circuit that measures the load current, for example for a load series-coupled to the LED and the inductor, and a control circuit controlling the switch based on the measured load current to control constantly maintaining a load average current.

Various technologies relate to an average inductor current mode switching converters and relate to a control circuit and a method for regulating an average inductor current in switching converter. These technologies disclose aspects of a control circuit controlling a load current on the power supply.

Figure 1:
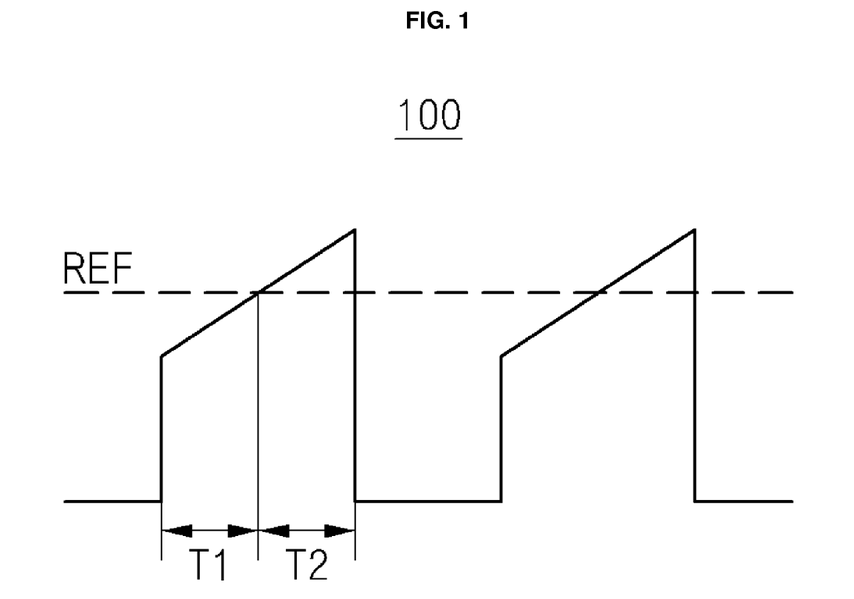
FIG. 1 illustrates a waveform diagram of a load current controlled by a control circuit.

FIG. 1 illustrates a waveform diagram of a load current controlled by a control circuit.

Referring to FIG. 1, an x-axis and a y-axis respectively represent a time and a current value. Thus, FIG. 1 illustrates how the load current changes over time.

The control circuit of FIG. 1 senses a current that flows to a load through a sensing circuit and stores a time when a sensed current reaches a predefined reference current value REF. For example, the control circuit stores a reach time T1, where the reach time T1 indicates a time from when a switch controlling a current is turned on to a time when the sensed current reaches the predefined reference current value REF.

The control circuit counts the reach time T1 stored at a time when the sensed current reaches the predefined reference current REF and turns off a switch at an elapsed time T2 corresponding to the reach time T1. The average current of the load current is maintained at the predefined reference current REF.

In such a control circuit, the load current is assumed to constantly increase. However, when the load current does not constantly change, there is an issue that it is difficult to control the average current so that the average current is substantially the same as the reference current.

Also, such a control circuit includes an intermediate operational circuit for determining the reach time when the sensed current reaches the reference current and storing the determined reach time. Therefore, such a control circuit presents issues that a delay time for a current control occurs and it is difficult to control the average current according to a change of the input power and the load.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide a switch control technology of a power supply device capable of quickly and accurately performing an average current control.

Examples provide a switch control technology of a power supply device capable of performing a current control in real-time.

In one general aspect, a switch control circuit for controlling a current control switch of a power supply, the power supply including a load, an inductor and the current control switch that are series-coupled to an input power includes a current measuring unit configured to measure a current flowing into the load, a current integral unit configured to integrate the measured current, a comparison unit configured to compare the integrated current value and a reference value, and a control unit that is coupled to the current control switch, the control unit being configured to turn off the current control switch in response to the integrated current value being substantially same as the reference value and to turn on the current control switch in response to a predefined off-time having elapsed from a time when the current control switch is turned off.

The current control switch may be a Metal-Oxide-Semiconductor Field Effect Transistor (MOSFET).

The current measuring unit may include a current measuring resistor coupled between one terminal of the current control switch and the reference voltage and configured to measure a voltage at both sides of the current measuring resistor.

The current integral unit may include a V-I converter configured to convert the measured voltage to a current.

The current integral unit may integrate a predefined reference current to generate the reference value, varying according to time.

The current integral unit may include a first dependent current source configured to supply a first current having a value that is substantially the same as the measured current value, a second dependent current source configured to supply a second current having a value that is substantially the same as a reference current value related to the reference value, and a pair of capacitors that are respectively series-coupled to the first and second dependent current sources, wherein the current integral unit performs integration operations on the measured current and the reference current through each of the pair of capacitors.

The second dependent current source may include a differential amplifier circuit, wherein the differential amplifier circuit doubly amplifies the reference current to amplify a difference between the amplified reference current and the measured current.

The current integral unit may include a constant current source configured to supply a specific current, a first switch that is series-coupled to the constant current source, the first switch being configured to be controlled by the measured current, a second switch that is series-coupled to the constant current source, the second switch being configured to be controlled by a reference current related to the reference voltage, and a pair of capacitors that are respectively series-coupled to the first and second switches, the pair of capacitors being configured to perform integration operations on currents flowing into the first and second switches.

The comparison unit may be a differential amplifier.

The control unit may include an off-time control unit configured to count the predefined off-time from a time at which the current control switch is turned off, and a switch driving unit configured to control the current control switch based on outputs of the comparison unit and the off-time control unit.

The switch driving unit may be an SR latch configured to perform NOR or NAND logic operations on outputs of the comparison unit and the off-time control unit.

In another general aspect, a switch control method performed in a switch control circuit for controlling a current control switch of a power supply, the power supply including a load, an inductor and the current control switch that are series-coupled to an input power includes measuring a current flowing into the load, integrating the measured current, comparing the integrated current value and a reference value, turning off the current control switch in response to the integrated current value being substantially same as the reference value, and turning on the current control switch in response to a predefined off-time elapsing from a time when the current control switch is turned off.

In another general aspect, a converter includes a load that is series-coupled to an input power, an inductor that is series-coupled to the load, a current control switch that is series-coupled to the inductor, the current control switch being configured to control a current flowing into the load, a freewheeling diode that is parallel-coupled to the load and the inductor that are series-coupled with each other, and a switch control circuit configured to control the current control switch, wherein the switch control circuit includes a current measuring unit configured to measure a current flowing into the load, a current integral unit configured to integrate the measured current, a comparison unit configured to compare the integrated current value and a reference value, and a control unit that is coupled to the current control switch, the control unit being configured to turn off the current control switch in response to the integrated current value being substantially the same as the reference value and to turn on the current control switch in response to a predefined off-time elapsing from a time when the current control switch is turned off.

In another general aspect, a switch control circuit for controlling a current control switch includes a current measuring unit configured to measure a current flowing into a load that is series-coupled to an input power, wherein the load, an inductor, and the current control switch are series-coupled to an input power, a current integral unit configured to integrate the measured current, a comparison unit configured to compare the integrated current value and a reference value, and a control unit that is coupled to the current control switch, the control unit being configured to turn off the current control switch in response to the integrated current value being substantially same as the reference value and to turn on the current control switch in response to a predefined off-time have elapsed from a time when the current control switch is turned off.

The current control switch may be a Metal-Oxide-Semiconductor Field Effect Transistor (MOSFET).

The current measuring unit may include a current measuring resistor coupled between one terminal of the current control switch and the reference voltage and configured to measure a voltage at both sides of the current measuring resistor.

The current integral unit may include a first dependent current source configured to supply a first current having a value that is substantially the same as the measured current value, a second dependent current source configured to supply a second current having a value that is substantially the same as a reference current value related to the reference value, and a pair of capacitors that are respectively series-coupled to the first and second dependent current sources, wherein the current integral unit performs integration operations on the measured current and the reference current through each of the pair of capacitors.

The second dependent current source may include a differential amplifier circuit, wherein the differential amplifier circuit doubly amplifies the reference current to amplify a difference between the amplified reference current and the measured current.

The current integral unit may include a constant current source configured to supply a specific current, a first switch that is series-coupled to the constant current source, the first switch being configured to be controlled by the measured current, a second switch that is series-coupled to the constant current source, the second switch being configured to be controlled by a reference current related to the reference voltage, and a pair of capacitors that are respectively series-coupled to the first and second switches, the pair of capacitors being configured to perform integration operations on currents flowing into the first and second switches.

The control unit may include an off-time control unit configured to count the predefined off-time from a time at which the current control switch is turned off, and a switch driving unit configured to control the current control switch based on outputs of the comparison unit and the off-time control unit.

The described examples have the following advantages. However, this does not mean that all examples include all the following advantages or are limited to include just the following advantages.

The switch control technology according to examples respectively integrates and compares the measured current and the reference current. By so doing, examples quickly and accurately perform an average current control.

Thus, the switch control technology according to examples performs a current control in real time through current integration operations.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms used in the present disclosure may be understood as follows.

While terms such as "first" and "second," etc., may be used to describe various components, such components are not to be understood as being limited to the above terms. The above terms are used only to distinguish one component from another. For example, a first component may be referred to as a second component without departing from the scope of the present disclosure, and likewise a second component may be referred to as a first component.

It is to be understood that when an element is referred to as being "coupled to" another element, such an element in some examples is directly coupled to the other element or intervening elements may also be present. In contrast, when an element is specifically referred to as being "directly coupled to" another element, no intervening elements are present. Also, unless explicitly specified to the contrary, the word "comprise" and variations such as "comprises" or "comprising," are to be understood to imply the inclusion of stated elements but do not imply the exclusion of any other elements. Meanwhile, other expressions describing relationships between components such as "~between", "immediately~between" or "adjacent to~" and "directly adjacent to~" are to be interpreted similarly.

Singular forms "a", "an" and "the" in the present disclosure are intended to include the plural forms as well, unless the context clearly indicates otherwise. It is to be further understood that terms such as "including" or "having," etc., are intended to indicate the existence of the features, numbers, operations, actions, components, parts, or combinations of such disclosed in the specification in certain examples, and are not intended to preclude the possibility that one or more other features, numbers, operations, actions, components, parts, or combinations thereof exist or are added in other examples.

The terms used in the present application are merely used to describe various examples, and are not intended to limit the present disclosure. Unless otherwise defined, all terms used herein, including technical or scientific terms, have the same meanings as those generally understood by those with ordinary knowledge in the field of art to which the present disclosure belongs in view of the present disclosure. Such terms as those defined in a generally used dictionary are to be interpreted to have the meanings equal to the contextual meanings in the relevant field of art, and are not to be interpreted to have ideal or excessively formal meanings unless clearly so defined in the present disclosure.

Figure 2:
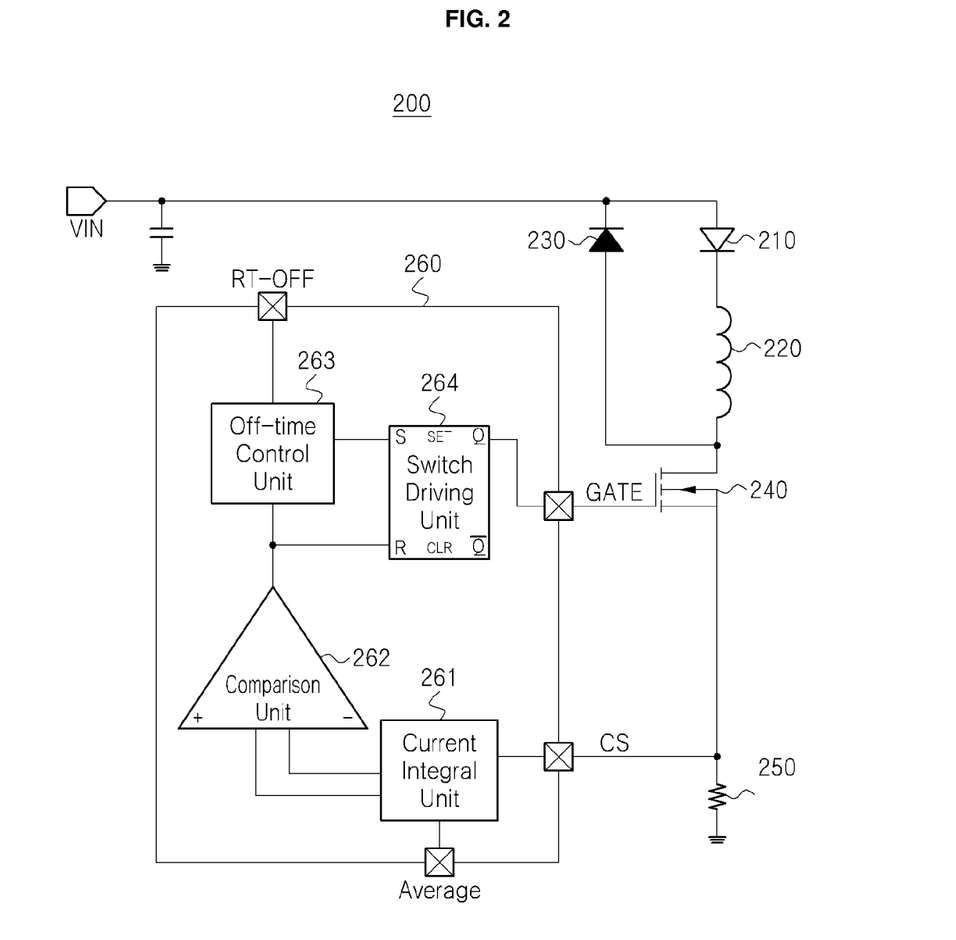
FIG. 2 is a circuit diagram illustrating a converter according to an example.

FIG. 2 is a circuit diagram illustrating a converter according to an example.

Referring to FIG. 2, a converter 200 includes a load 210, an inductor 220, a freewheeling diode 230, a current control switch 240 and a switch control circuit 260.

The converter 200 corresponds to a power supply. For example, the converter 200 is a buck converter outputting a voltage being lower than an input voltage.

The load 210 corresponds to an element that is series-coupled to an input voltage VIN. For example, the load 210 element consumes an energy. In an example, the load 210 is implemented as a LED (Light Emitting Diode) device.

The inductor 220 stores energy supplied by an input power or releases the stored energy according to an operation of the current control switch 240. The operation of the current control switch 240 is to be described further below. In this example, the inductor 220 induces a voltage that is proportional to a change amount of a current input to the inductor 220 to suppress a sudden change of the current and store an energy of a quantity that is proportional to a square of the current input to the inductor 220.

For example, turn-on and turn-off periods of the current control switch 240 are changed in response to one another according to a variable inductor capacity. Therefore, an operational frequency of the current control switch 240 is changed in response to turn-on and turn-off periods.

In the example of FIG. 2, the freewheeling diode 230 forms a current movement loop providing a corresponding energy to the load 210 when the energy is output by the inductor 220. Furthermore, the freewheeling diode 230 outputs the stored energy in the inductor 220 to the load 210 to consume the stored energy in the inductor 220 when the current control switch 240 is turned off. Also, in the example of FIG. 2, the freewheeling diode 230 prevents damage to the converter 200, such as damage to the current control switch 240 caused by a spark, caused by the flow of the charged current from the inductor 220 into the current control switch 240.

In the example of FIG. 2, the current control switch 240 is series-coupled to the inductor 220 and repeatedly performs turn-on and turn-off operations to control a current amount flowing into the load 210.

Also in examples, the current control switch 240 is turned on or turned off by a control signal and selectively provides the movement loop of the current flowing into the inductor 220 according to the turned-on or turned-off state of the current control switch 240.

When current control switch 240 is turned on, the current flows into the inductor 220 supplied by the input power, the energy accumulates in the inductor 220 and the current increasingly flows into the load 210.

Afterward, when current control switch 240 is turned off, the current movement loop is formed so that an inductor current, that is, a current derived from the energy accumulated in the inductor 220, flows into the load 210 through the freewheeling diode 230. The inductor current decreases until the current control switch 240 is turned on. Meanwhile, in the example of FIG. 2, the converter 200 repeatedly turns on and turns off the current control switch 240 to output a pulse-type current.

The switch control circuit 260 controls an operation of the current control switch 240. More specifically, in examples, the switch control circuit 260 measures the current flowing into the load 210 to control the operation of the current control switch 240 based on a reference voltage and a result of an integration operation that integrates the measured current. Hereinafter, a switch control circuit 260 is described further.

Referring to FIG. 2, the switch control circuit 260 includes a current measuring unit, a current integral unit 261, a comparison unit 262 and a control unit.

In the example of FIG. 2, the current measuring unit measures the current flowing into the load 210. In the example of FIG. 2, the current measuring unit includes a current measuring resistor 250 coupled between one terminal of the current control switch 240 and a reference voltage of the circuit to measure the current flowing into the load 210 based on a voltage at both sides of the current measuring resistor 250, or similarly, a voltage at CS terminals.

In one example, the current measuring unit includes a voltage-to-current (V-I) converter converting the voltage at both sides of the current measuring resistor 250 to the measured current. In this example, the V-I converter is installed at a terminal for measuring a current in the switch control circuit 260. Meanwhile, the V-I converter is arranged between the current measuring unit and current integral unit 261. In an example, the V-I converter is included in the current integral unit 261.

In this example, the current integral unit 261 performs an integration operation on the measured current.

In one example, the current integral unit 261 integrates a predefined reference current to generate an appropriate reference voltage that varies according to time. In one example, the predefined reference current is set in the manufacturing process or in another example is varied by a pin providing the current installed in an outside of the current integral unit 261 or a specific program that sets such a current. In another example, the predefined reference current is set by a user through an Average terminal, where the Average terminal is a computer with input capability that allows the user to set the predefined reference current.

For example, the current integral unit 261 receives the current measured in the current measuring unit and the predefined reference current. The current integral unit 261 then performs the integration operation on each of them.

A configuration of the current integral unit 261 is described with reference to FIGS. 3 through 5.

In one example, the current integral unit 261 performs the integration operation while the current control switch 240 is turned on. In this example, the current integral unit 261 is reset at a time when the current control switch 240 is turned off. For example, the current integral unit 261 provides an energy accumulated in a capacitor and is to be reset at a time when the current control switch 240 is turned off.

In this example, the comparison unit 262 compares the current value integrated in the current integral unit 261 and the reference voltage. As part of this comparison, the reference voltage corresponds to an increasing form according to a specific slope or corresponds to an integration result of integrating the predefined reference current in the current integral unit 261. As discussed below, the reference voltage is assumed to the integrated reference current.

In this example, the comparison unit 262 compares each of the current values integrated in the current integral unit 261, as discussed previously.

Further, the comparison unit 262 compares an integral value of the measured current, that is, a first integral value and an integral value of the reference current or the reference voltage, that is, a second integral value.

In one example, the comparison unit 262 is implemented as an amplifier, such as a differential amplifier.

For example, the comparison unit 262 compares the first and second integral values by output the difference of the integral values, for example by calculating the first integral value minus the second integral value. Because the reference value is greater than that of the measured current at a time when the current control switch 240 is turned on, the comparison unit 262 may output a negative value, indicated by a low level or 0. As time passes, because the current value flowed to the load 210 increases, the comparison unit 262 may output a positive value, indicated by a high level or 1.

The control unit is coupled to the current control switch 240 and turns off the current control switch 240 when the integrated current value is substantially same with that of the reference value as determined using the comparison unit 262. In this example, the control unit is coupled to a gate terminal of the current control switch 240.

Further, in this example, the control unit generates a control signal that turns on the current control switch 240 to control the current control switch 240 so that the current control switch forms a current movement loop that flows a current into the load 210 by the input power.

Afterwards, the control unit generates a control signal turning off the current control switch 240 to cut off the current flowing into the current movement loop from the input power when an output sign of the comparison unit 262 changes, such as from a negative value to a positive value. That is, such a sign change occurs when the integrated measuring current is substantially same as that of the reference voltage, or alternatively when each of the integrated current values is substantially same as one another.

Also, the control unit generates a control signal turning on the current control switch 240 to form the current movement loop that outputs the current into the load 210 through the current control switch 240 by the input power when a specific time elapses after a turn-off time of the current control switch 240. In an example, such a specific time is a predefined off-time.

In one example, the control unit includes an off-time control unit 263 that counts the predefined off-time from a time at which the current control switch 240 is turned off. Herein, the turn-off time corresponds to a time from a time at which the current control switch 240 is turned off to include the time when the current control switch 240 is maintained as being turned off.

For example, the off-time control unit 263 outputs a low level signal, for example, a value of 0, during the turn-off time or outputs a high level signal, for example, a value of 1, when the turn-off time elapses.

In one example, the off-time control unit 263 further includes a time set module setting the off-time according to an external input or a specific program. For example, such off-time is potentially set by a user through an RT-OFF terminal.

In one example, the control unit includes a switch driving unit 264 that controls the current control switch 240 based on outputs of the comparison unit 262 and the off-time control unit 263.

Further, in an example, the switch driving unit 264 performs a NOR or a NAND logic operation on outputs of the comparison unit 262 and the off-time control unit 263. The result of such a logic operation is then output as the control signal controlling the current control switch 240.

In one example, the switch driving unit 264 is implemented as an SR latch that performs a NOR or NAND logic operation on the outputs of the comparison unit 262 and the off-time control unit 263.

In such an example, the input terminals S and R of the SR latch respectively receive the outputs of the off-time control unit 263 and the comparison unit 262. In this example, when the input terminal S receives the high level signal, such as a value of 1, the SR latch assumes a state of SET to output a control signal that turns on the current control switch 240 from an output terminal Q. Afterward, when the input terminal R receives the high level signal, such as a value of 1 or a positive signal, according to the output of the comparison unit 262, the SR latch assumes a state of RESET to output the control signal that turns off the current control switch 240 in the output terminal Q. Meanwhile, when the output of the comparison unit 262 reaches the high level, the off-time control unit 263 outputs the low level signal.

As a result, the switch control circuit 260 of such an example quickly and accurately controls the load current to perform the integration operation while the current control switch 240 is turned on. Also, the switch control circuit 260 reflects changes of the input power and the output power in real time to accurately control the average current of the load in comparison with alternative technologies.

Figure 3A:
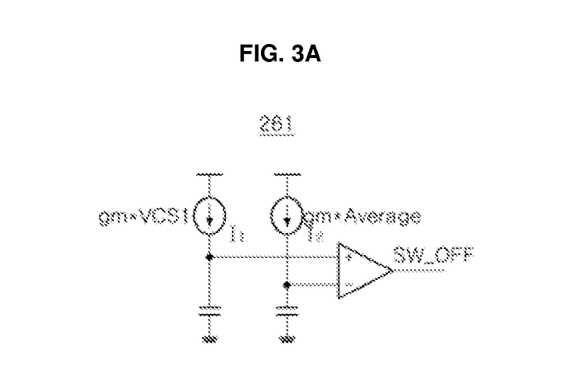
FIGS. 3A-3C are a circuit diagram and a wave diagram illustrating the current integral unit of FIG. 2 according to an example.
Figure 3B:
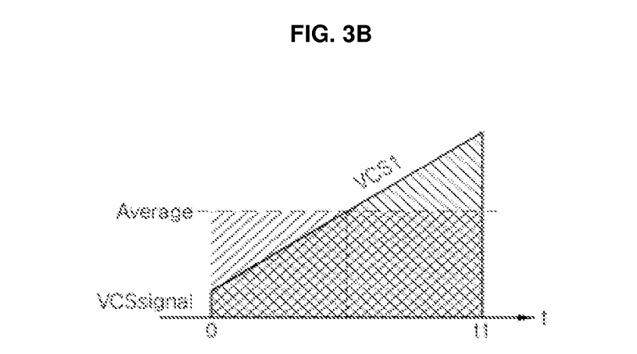
Figure 3C:
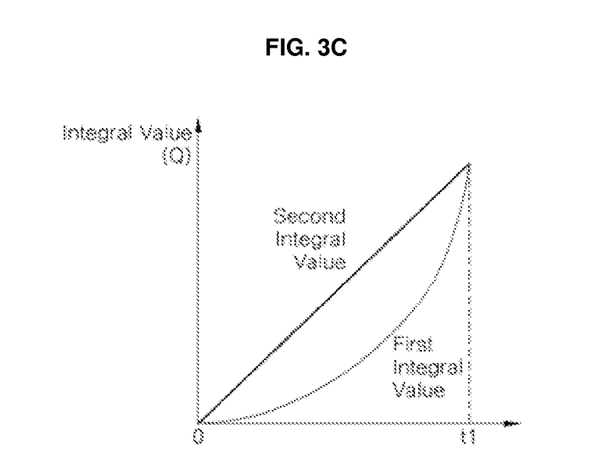
Figure 4A:
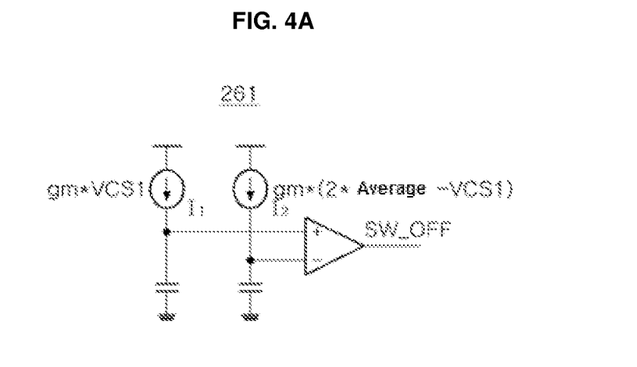
FIGS. 4A-4C are a circuit diagram and a wave diagram illustrating the current integral unit of FIG. 2 according to another example.
Figure 4B:
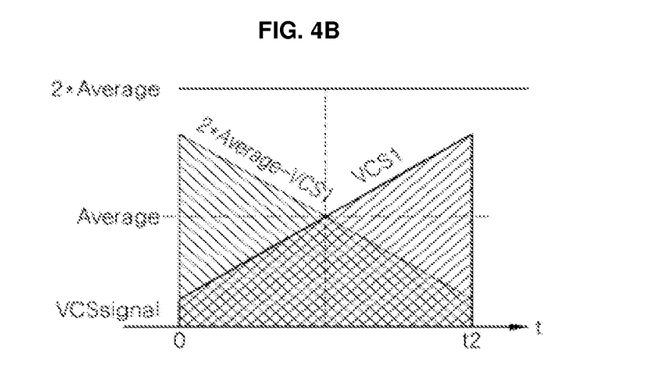
Figure 4C:
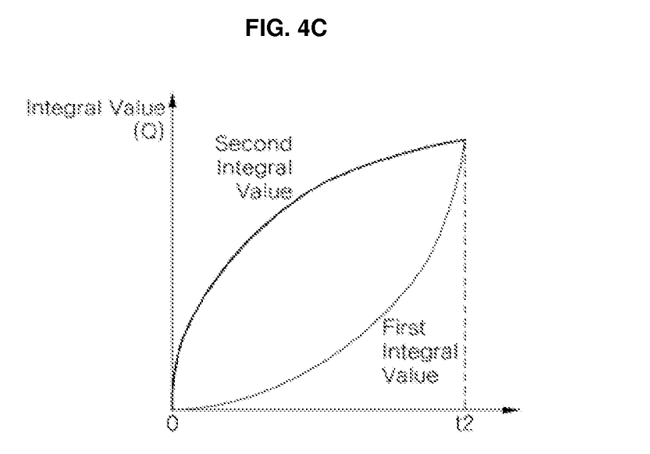
Figure 5A:
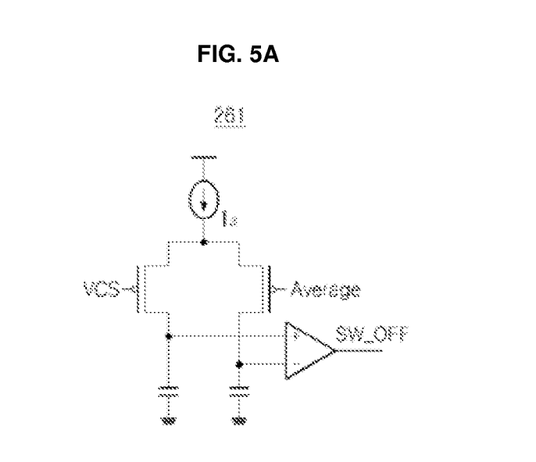
FIGS. 5A-5C are a circuit diagram and wave diagram illustrating the current integral unit of FIG. 2 according to the other example.
Figure 5B:
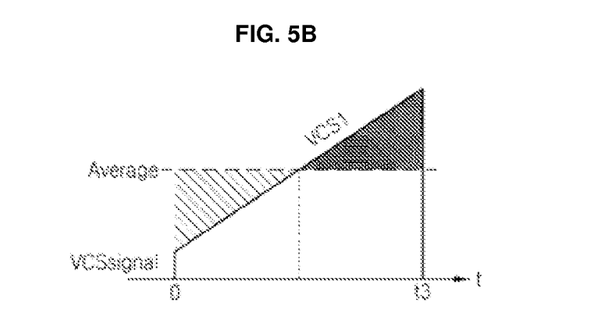
Figure 5C:
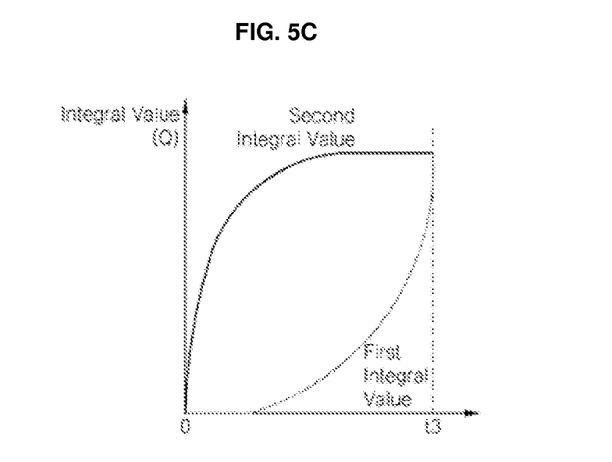

A detailed configuration of the current integral unit 261 in FIG. 2 is described further with references to FIGS. 3 through 5.

FIGS. 3A-3C are a circuit diagram and a wave diagram illustrating the current integral unit of FIG. 2 according to an example.

Referring to FIG. 3A, the current integral unit 261 includes a pair of dependent current sources and a pair of capacitors respectively series-coupled to the pair of the dependent current sources.

Further, a first dependent current source corresponds to a current source that provides a first current I1 in response to the measured current and a second dependent current source corresponds to a current source that provides a second current I2 in response to the reference current.

In this example, the first dependent current source provides the first current I1, where I1 corresponds to "gm*VCS1". Herein, "gm" corresponds to a current ratio of the measured current and corresponds to an arbitrary constant. Also, in this example, the second dependent current source provides I2, where I2 corresponds to "gm*Average". In this example, the "gm" value of the I2 is substantially same with that of the I1.

The pair of the capacitors in this example performs the integral operations on each of the measured current and the reference current.

A first node is coupled to an input terminal, for example the + terminal, of the comparison unit 262, and the first node is also coupled to the first dependent current source and the capacitor. A voltage of the first node is provided to the input terminal of the comparison unit 262, for example the + terminal. Also, a second node is coupled to another input terminal, for example the − terminal, of the comparison unit 262, and the second node is also coupled to the second dependent current source and the capacitor. A voltage of the second node is provided to the input terminal of the comparison unit 262, for example the − terminal.

Referring to FIG. 3B, an x-axis and a y-axis respectively represent a time and a current value.

The reference current Average is assumed to be a fixed value that has a predefined value regardless of how much time elapses and the measured current VCS1 is assumed to constantly increase as time elapses.

Referring to FIG. 3C, an x-axis and a y-axis respectively represent a time and the integrated current value, that is, an integral value, Q.

The current integral unit 261 performs integration operations on each of the currents from a time when the current control switch 240 is turned on, such as indicated by the low level signal or the value of 0. As illustrated, the integral value of the measured current, that is, the first integral value, has a parabolic form because the measured current constantly increases in a linear fashion as time elapses and the integral of a linear function is a quadratic function. Also, the integral value of the reference current, that is, the second integral value, represents a specific sloped form because the reference current has a fixed value, and the integral of a constant function is a linear function.

As shown in the example, a graph of the first integral value intersects with that of the second integral value at a time t1 when the first integral value is substantially same with the second integral value. That is, t1 may correspond to a time when a graph area under the Average function is substantially same with that of the VCS1 in FIG. 3B.

Meanwhile, in this example, at the time t1, the switch control circuit 260 turns off the current control switch 240 and the current integral unit 261 is reset.

In an example, the second dependent source doubly amplifies the reference current and further includes a differential amplifier circuit for amplifying a difference between the amplified reference current and the measured current.

FIGS. 4A-4C are a circuit diagram and a wave diagram illustrating the current integral unit in FIG. 2 according to another example.

Referring to FIG. 4A, FIG. 4A represents a similar configuration with FIG. 3A but the size of the current I2 value provided from the second dependent current source corresponds to "gm*(2*Average−VCS1)".

Further in FIG. 4A, an internal circuit of the second dependent current source includes an amplifier and the second dependent current source doubly amplifies the reference current. The second dependent current source amplifies the difference between the amplified reference current and the measured current to supply I2, where I2 corresponds to "gm*(2*Average−VCS1)".

Therefore and although an offset occurs in the measured current, the switch control unit 260 mutually supplements an offset value occurring in the first and second dependent current sources to accurately control the current regardless of the offset.

Referring to FIG. 4B, the current of the second dependent current source constantly decreases as time elapses.

Referring to FIG. 4C, the first integral value has a parabolic form because the measured current constantly increases in a linear fashion as time elapses and the integral of a linear function is a quadratic function and the second integral value has a parabolic form because the current of the second dependent current source constantly decreases in a linear fashion as time elapses. As illustrated in FIG. 3C, the switch control circuit 260 turns off the current control switch 240 and the current integral unit 261 is reset at a time t2 when a graph of the first integral value intersects with that of the second integral value.

In one example, the current integral unit 261 includes a constant current source, first and second switches and a pair of capacitors. The constant current source supplies a specific current. The first switch is series-coupled to the constant current source and is controlled by the measured current. The second switch is series-coupled to the constant current source and is controlled by the reference current. The pair of capacitors is respectively series-coupled to the first and second switches and performs an integration operation on a current that flows through the first and second switches.

FIGS. 5A-5C are a circuit diagram and wave diagram illustrating the current integral unit in FIG. 2 according to another example.

Referring to FIG. 5A, the current integral unit 261 includes a constant current source and first and second switches that are respectively series-coupled to the constant current source.

As one constant current source is illustrated, this means current values I3 respectively flowing into the first and second switches are substantially the same. Also, the constant current source is implemented in another example as two constant current sources and in such an example current values supplied from the two constant current sources are also substantially the same.

In such an example, a current value flowing from the first switch into the first capacitor is decided based on that of the measured current and a current value flowing from the second switch into the second capacitor is decided based on that of the reference current.

Referring FIG. 5B, the reference current Average is assumed to a fixed value having a predefined value regardless of time elapsed and the measured current VCS1 is assumed to constantly increase according to time elapsed.

Referring to the example of FIG. 5C, the first integral value, that is a quantity of electric charge accumulated in the first capacitor, rapidly increases at a specific time, such as at a time when voltage exceeds a threshold voltage of the switch, because a current value passing through the first switch constantly increases until the voltage value applied to a gate of the first switch exceeds a constant voltage value applied to a gate of the second switch. In such an example, the second integral value is saturated to a specific value because a current value passing through the second switch constantly decreases until the voltage value applied to a gate of the first switch exceeds a constant voltage value applied to a gate of the second switch.

As illustrated in FIG. 5C, the switch control circuit 260 turns off the current control switch 240 and the current integral unit 261 is reset at a time t3 when a graph of the first integral value intersects with that of the second integral value.

For example, the switch control method is performed by the switch control circuit 260, the switch control circuit 260 controls the current control switch 240 of the power supply, and the power supply includes the load, the inductor and the current control switch 240 that are respectively series-coupled to the input power.

The switch control method includes the following operations.

In operation S610, the switch control circuit 260 measures the current flowing into the load through the current measuring unit.

In operation S620, the switch control circuit 260 integrates the measured current passing through the current integral unit 261. In this operation, the switch control circuit 260 performs integration operations on the predefined reference current to generate the reference voltage.

In operation S630, the switch control circuit 260 compares the integrated current value and the reference value or integrated reference current in the comparison unit 262.

In operation S640, the switch control circuit 260 turns off the current control switch 240 using the switch driving unit 264 when the integrated current value is substantially same as that of the reference value.

In an example, the switch control circuit 260 turns on the current control switch 240 when the predefined off-time elapses from a time when the current control switch 240 is turned off.

Accordingly, the switch control circuit 260 counts the off-time from a time when the current control switch 240 is turned off using the off-time control unit 263 and turns on the current control switch 240 using the switch driving unit 264 when the off-time elapses.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A switch control circuit for controlling a current control switch of a power supply, the power supply comprising a load, an inductor and the current control switch that are series-coupled to an input power, the switch control circuit comprising:
    a current measuring unit configured to measure a current flowing into the load;
    a current integral unit configured to integrate the measured current;
    a comparison unit configured to compare the integrated current value and a reference value; and
    a control unit that is coupled to the current control switch, the control unit being configured to turn off the current control switch in response to the integrated current value being substantially same as the reference value and to turn on the current control switch in response to a predefined off-time having elapsed from a time when the current control switch is turned off.

2. The switch control circuit of claim 1, wherein the current control switch is a Metal-Oxide-Semiconductor Field Effect Transistor (MOSFET).

3. The switch control circuit of claim 1, wherein the current measuring unit comprises a current measuring resistor coupled between one terminal of the current control switch and the reference voltage and configured to measure a voltage at both sides of the current measuring resistor.

4. The switch control circuit of claim 3, wherein the current integral unit comprises a V-I converter configured to convert the measured voltage to a current.

5. The switch control circuit of claim 1, wherein the current integral unit integrates a predefined reference current to generate the reference value, varying according to time.

6. The switch control circuit of claim 1, wherein the current integral unit comprises:
    a first dependent current source configured to supply a first current having a value that is substantially the same as the measured current value;
    a second dependent current source configured to supply a second current having a value that is substantially the same as a reference current value related to the reference value; and
    a pair of capacitors that are respectively series-coupled to the first and second dependent current sources,
    wherein the current integral unit performs integration operations on the measured current and the reference current through each of the pair of capacitors.

7. The switch control circuit of claim 6, wherein the second dependent current source comprises a differential amplifier circuit, wherein the differential amplifier circuit doubly amplifies the reference current to amplify a difference between the amplified reference current and the measured current.

8. The switch control circuit of claim 1, wherein the current integral unit comprises:
    a constant current source configured to supply a specific current;
    a first switch that is series-coupled to the constant current source, the first switch being configured to be controlled by the measured current;
    a second switch that is series-coupled to the constant current source, the second switch being configured to be controlled by a reference current related to the reference voltage; and
    a pair of capacitors that are respectively series-coupled to the first and second switches, the pair of capacitors being configured to perform integration operations on currents flowing into the first and second switches.

9. The switch control circuit of claim 1, wherein the comparison unit is a differential amplifier.

10. The switch control circuit of claim 1, wherein the control unit comprises:
    an off-time control unit configured to count the predefined off-time from a time at which the current control switch is turned off; and a switch driving unit configured to control the current control switch based on outputs of the comparison unit and the off-time control unit.

11. The switch control circuit of claim 10, wherein the switch driving unit is an SR latch configured to perform NOR or NAND logic operations on outputs of the comparison unit and the off-time control unit.

12. A switch control method performed in a switch control circuit for controlling a current control switch of a power supply, the power supply comprising a load, an inductor and the current control switch that are series-coupled to an input power, the switch control method comprising:
measuring a current flowing into the load; integrating the measured current;
comparing the integrated current value and a reference value;
turning off the current control switch in response to the integrated current value being substantially same as the reference value; and
turning on the current control switch in response to a predefined off-time elapsing from a time when the current control switch is turned off.

13. A converter comprising:
a load that is series-coupled to an input power;
an inductor that is series-coupled to the load;
a current control switch that is series-coupled to the inductor, the current control switch being configured to control a current flowing into the load;
a freewheeling diode that is parallel-coupled to the load and the inductor that are series-coupled with each other; and
a switch control circuit configured to control the current control switch, wherein the switch control circuit comprises a current measuring unit configured to measure a current flowing into the load, a current integral unit configured to integrate the measured current, a comparison unit configured to compare the integrated current value and a reference value, and a control unit that is coupled to the current control switch, the control unit being configured to turn off the current control switch in response to the integrated current value being substantially the same as the reference value and to turn on the current control switch in response to a predefined off-time elapsing from a time when the current control switch is turned off.

14. A switch control circuit for controlling a current control switch, the switch control circuit comprising:
a current measuring unit configured to measure a current flowing into a load that is series-coupled to an input power, wherein the load, an inductor, and the current control switch are series-coupled to an input power;
a current integral unit configured to integrate the measured current;
a comparison unit configured to compare the integrated current value and a reference value; and
a control unit that is coupled to the current control switch, the control unit being configured to turn off the current control switch in response to the integrated current value being substantially same as the reference value and to turn on the current control switch in response to a predefined off-time have elapsed from a time when the current control switch is turned off.

15. The switch control circuit of claim 14, wherein the current control switch is a Metal-Oxide-Semiconductor Field Effect Transistor (MOSFET).

16. The switch control circuit of claim 14, wherein the current measuring unit comprises a current measuring resistor coupled between one terminal of the current control switch and the reference voltage and configured to measure a voltage at both sides of the current measuring resistor.

17. The switch control circuit of claim 14, wherein the current integral unit comprises:
a first dependent current source configured to supply a first current having a value that is substantially the same as the measured current value;
a second dependent current source configured to supply a second current having a value that is substantially the same as a reference current value related to the reference value; and
a pair of capacitors that are respectively series-coupled to the first and second dependent current sources,
wherein the current integral unit performs integration operations on the measured current and the reference current through each of the pair of capacitors.

18. The switch control circuit of claim 17, wherein the second dependent current source comprises a differential amplifier circuit, wherein the differential amplifier circuit doubly amplifies the reference current to amplify a difference between the amplified reference current and the measured current.

19. The switch control circuit of claim 14, wherein the current integral unit comprises:
a constant current source configured to supply a specific current;
a first switch that is series-coupled to the constant current source, the first switch being configured to be controlled by the measured current;
a second switch that is series-coupled to the constant current source, the second switch being configured to be controlled by a reference current related to the reference voltage; and
a pair of capacitors that are respectively series-coupled to the first and second switches, the pair of capacitors being configured to perform integration operations on currents flowing into the first and second switches.

20. The switch control circuit of claim 14, wherein the control unit comprises:
an off-time control unit configured to count the predefined off-time from a time at which the current control switch is turned off; and
a switch driving unit configured to control the current control switch based on outputs of the comparison unit and the off-time control unit.

* * * * *